(12) United States Patent
Kaler et al.

(10) Patent No.: US 7,451,157 B2
(45) Date of Patent: Nov. 11, 2008

(54) SCOPED METADATA IN A MARKUP LANGUAGE

(75) Inventors: Christopher G. Kaler, Sammamish, WA (US); John P. Shewchuck, Redmond, WA (US); David Langworthy, Kirkland, WA (US); Donald Box, Bellevue, WA (US); Steven E. Lucco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 497 days.

(21) Appl. No.: 10/270,440

(22) Filed: Oct. 15, 2002

(65) Prior Publication Data

US 2003/0074367 A1 Apr. 17, 2003

Related U.S. Application Data

(60) Provisional application No. 60/329,796, filed on Oct. 16, 2001, provisional application No. 60/346,370, filed on Oct. 19, 2001, provisional application No. 60/371,155, filed on Apr. 10, 2002.

(51) Int. Cl.
*G06F 17/00* (2006.01)

(52) U.S. Cl. .................. 707/102; 707/101; 707/100

(58) Field of Classification Search ......... 707/100–102, 707/103 R
See application file for complete search history.

(56) References Cited

U.S. PATENT DOCUMENTS

| | | | | |
|---|---|---|---|---|
| 6,571,236 | B1 * | 5/2003 | Ruppelt | 707/3 |
| 6,850,893 | B2 * | 2/2005 | Lipkin et al. | 705/8 |
| 6,851,054 | B2 * | 2/2005 | Wheeler et al. | 713/176 |
| 6,928,442 | B2 * | 8/2005 | Farber et al. | 707/10 |
| 2002/0174178 | A1 * | 11/2002 | Stawikowski | 709/203 |
| 2003/0120593 | A1 * | 6/2003 | Bansal et al. | 705/39 |

OTHER PUBLICATIONS

11. Using Dublin Core, issued Jul. 16, 2000 by Diane Hillmann, pp. 1-10.*
Structured graph format: XML metadata for describing website structure, Liechti et al. pp. 11-21, issued 1998.*
Samjani, "Mobile Internet Protocol", IEEE Potentials, vol. 20, No. 1, Feb.-Mar. 2001, pp. 16-18.
"IP Routing Policies and Filters", printed from http://support.baynetworks.com/library/tpubs/html/switches/bstream/115401A/L_17.HTM on Sep. 26, 2002.
K. Swaminathan, "Negotiated Access Control", Proceedings of the 1985 Symposium on Security and Privacy: Apr. 22-24, 1985, pp. 190-196.

(Continued)

*Primary Examiner*—Sana Al-Hashemi
(74) *Attorney, Agent, or Firm*—Birch, Stewart, Kolasch and Birch, LLP (57) ABSTRACT

Methods, systems, and data structures for communicating object metadata are provided. A generic metadata container is presented that allows object metadata to be described in an extensible manner using protocol-neutral and platform-independent methodologies. A metadata scope refers to a dynamic universe of targets to which the included metadata statements correspond. Metadata properties provide a mechanism to describe the metadata itself, and metadata security can be used to ensure authentic metadata is sent and received. Mechanisms are also provided to allow refinement and replacement of metadata statements. Communication of metadata is expedited using hash digests to confirm metadata versions, and by piggybacking policy metadata requests and responses on other substantive data communication messages, thereby dynamically altering future communications.

25 Claims, 6 Drawing Sheets

OTHER PUBLICATIONS

W. LeFebvre, "Permissions And Access Control Lists", Performance Computing, vol. 16, No. 11, Oct. 1998, pp. 59-61.

B. Dunkel et al., "Customized Metadata for Internet Information", 1997 First International Conference on Knowledge-Based Intelligent Electronic Systems: Proceedings, vol. 2, May 21-23, 1997, pp. 508-516.

U. Srinvasan et al., "Managing Heterogeneous Information Systems through Discovery and Retrieval of Generic Concepts", Journal of the American Society for Information Science, vol. 51, No. 8, Jun. 2000, pp. 707-723.

J. Martinez et al., "MPEG-7 The Generic Multimedia Content Description Standard, Part 1", vol. 9, No. 2, Apr.-Jun. 2002, pp. 78-87.

C. Süβ et al., "Meta-modeling for Web-based Teachware Management", Advances in Conceptual Modeling: ER'99 Workshops on Evolution and Change in Data Management, Reverse Engineering In Information Systems, and the World Wide Web and Conceptual Modeling, 1999, pp. 360-373.

K. Lang et al., "XML, metadata and efficient knowledge discovery", Knowledge-Based Systems, vol. 13, No. 5, Oct. 2000, pp. 321-331.

T. Baker, "A Multilingual Registry for Dublin Core Elements and Qualifiers", ZfBB 47, 2000, pp. 14-19.

J. Moy, OSPF Version 2, Networking Working Group, RFC 2328, Ascend Communications, Inc., Apr. 1998, pp. 1-204.

J. Moy, OSPF Version 2, Networking Working Group, RFC 1247, Proteon, Inc., Jul. 1991, pp. 1-177.

* cited by examiner

```
<HTML>
<HEAD>
<META HTTP-EQUIV="CONTENT-TYPE" CONTENT="TEXT/HTML; CHARSET=ISO-8859-1" />
<TITLE>MICROSOFT CORPORATION -- WHERE DO YOU WANT TO GO TODAY?</TITLE>
<META HTTP-EQUIV="PICS-LABEL" CONTENT="(PICS-1.1 "HTTP://WWW.RSAC.ORG/
RATINGSV01.HTML" L GEN TRUE R (N 0 S 0 V 0 L 0))" />
<META NAME="KEYWORDS" CONTENT="PRODUCTS; HEADLINES; DOWNLOADS; NEWS; WEB SITE;
WHAT'S NEW; SOLUTIONS; SERVICES; SOFTWARE; CONTESTS; CORPORATE NEWS;" />
<META NAME="DESCRIPTION" CONTENT="THE ENTRY PAGE TO MICROSOFT'S WEB SITE. FIND
SOFTWARE, SOLUTIONS AND ANSWERS. SUPPORT, AND MICROSOFT NEWS." />
<META NAME="MS.LOCALE" CONTENT="EN-US" />
<META NAME="CATEGORY" CONTENT="HOME PAGE" />
...
</HEAD>
...
</HTML>
```

```
<METADATA>
    <SCOPE> HTTP://WWW.XYZCO.COM/MBOXSVC/ </SCOPE>
    <PROPERTIES>
        <EXPIRE>"10/15/2002"</EXPIRE>
        <AUTHOR>"RAD"</AUTHOR>
    </PROPERTIES>
    <STATEMENTS>
        <MAX_MSG_LEN>1024</MAX_MSG_LEN>
        <INCLUDE IDREF="COMMON_STATEMENTS"/>
    </STATEMENTS>
    <SECURITY>
        <SIGNATURE>"SKLH...SDN3"</SIGNATURE>
        <MD5HASH>"D41D...427E"</MD5HASH>
    </SECURITY>
</METADATA>
```

```
<POLICY>
    <SCOPE> ... </SCOPE>
    <PROPERTIES> ... </PROPERTIES>
    <STATEMENTS>
        <ENCRYPTION>
            <CHOICE>
                <DES PRIORITY="1" REQ="PASSPORT"/>
                <TRIPLE_DES PRIORITY="2" REQ="X509"/>
                <AES PRIORITY="3" NOT="PASSPORT"/>
            </CHOICE>
        </ENCRYPTION>
        ...
    </STATEMENTS>
    <SECURITY> ... </SECURITY>
</POLICY>
```

*FIG. 10*

SCOPED METADATA IN A MARKUP LANGUAGE

This application claims priority to provisional U.S. Application Ser. Nos.: 60/329,796 filed Oct. 16, 2001, 60/346,370 filed Oct. 19, 2001, and 60/371,155 filed on Apr. 10, 2002.

FIELD OF THE INVENTION

The invention relates generally to computer networks and web services offered over computer networks. More specifically, the invention relates to methods and systems for providing object metadata in an extensible manner using object scopes.

BACKGROUND OF THE INVENTION

Currently, much of the utility of computer systems lies in their ability to communicate and share information with other computer systems. Information is typically passed between computer systems via computer networks. Computer networks are groups of computers interconnected by wires or wireless mechanisms such as infrared, radio, and other technologies. The Internet is a global network of many smaller computer networks connected to one another. There is no controlling central network, but rather several high level networks that are connected through network access points. A network access point is a computer hardware or software device (commonly a network router) that serves as a kind of translator between two different networks.

Web services, generally, refers to application-to-application communication over the Internet via programmatic interfaces. For example, a local application (e.g., Microsoft® Money) on a client computer may communicate with a server application on a remote computer to obtain stock ticker information. The two applications may communicate the requested ticker symbol and the corresponding results via one or more messages transmitted over the Internet, without opening or using a traditional Internet browser such as Internet Explorer®.

The advent of XML (eXtensible Markup Language) and other protocol-neutral communications mechanisms has made it easier for web services to be offered between computers residing on different networks, written in different languages, and/or using different operating systems, yet still communicate effectively in an interoperable manner. However, these protocol neutral mechanisms do not provide an extensible mechanism to describe metadata regarding an object, nor do present metadata description techniques allow for the refining of metadata by other metadata or allow for secure metadata statements without the use of separate encryption technologies. Web services description language (WSDL) is known, however, WSDL described web services interfaces. WSDL does not describe metadata regarding a web service, such as its communication policies, etc.

Figure 1:
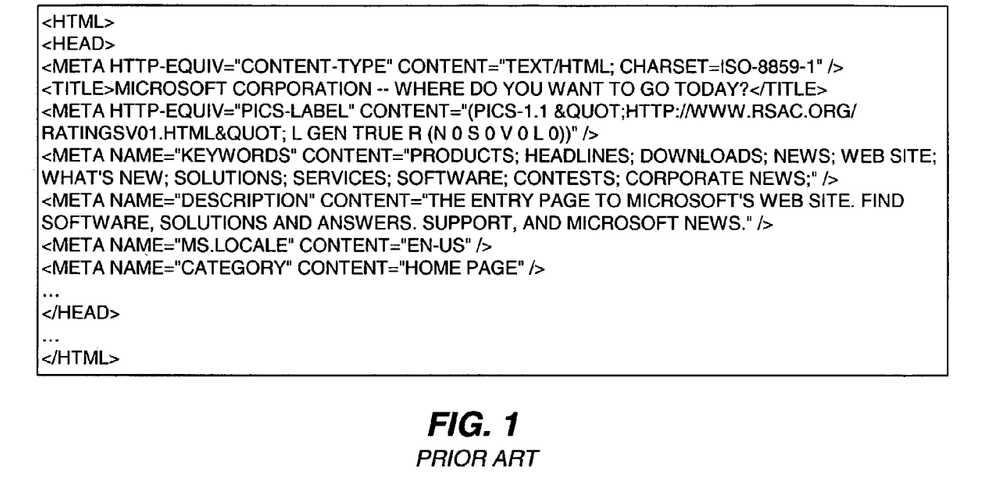
FIG. 1 illustrates conventional metadata in an HTML document.

FIG. 1 illustrates metadata in a conventional HTML document, e.g., from www.microsoft.com. In FIG. 1, each metadata element has a name (e.g., "keywords," "description," etc.) and corresponding content. These metadata elements apply only to the current object, i.e., the URL www.microsoft.com/default.asp. To conform with USPTO practice, the designator 'http://' has been left off the beginning of the above URLs.

Thus, it would be an advancement in the art to provide a mechanism for describing metadata in an extensible manner. It would be a further advancement in the art to allow metadata to refer to multiple objects, messages, and/or message patterns simultaneously. It would be a further advancement in the art to provide a metadata description mechanism that allows metadata statements to be refined by subsequent metadata statements. It would be a further advancement in the art to provide secure metadata statements without using external security measures.

BRIEF SUMMARY OF THE INVENTION

The inventive method and system overcomes the problems of the prior art by providing a generic metadata container that defines a scope of objects to which the metadata statements applies. The generic metadata container can be used to provide statements describing objects, as well as to refine previously made metadata statements.

According to an aspect of the invention, metadata information can be piggybacked on other substantive data communications in order to expedite communications. Thus, while separate metadata request and response messages may be sent prior to initiating substantive communications pursuant to the received metadata, the metadata request and response messages may be piggybacked on other messages also containing substantive data communications, such as information requests according to previously obtained metadata or according to metadata associated with another object and directed towards the other object.

An information requester may also expedite confirmation that the correct metadata is in use through the use of a hash digest to confirm metadata versions. With a metadata request, a requestor may include a hash digest of current metadata information stored in a memory of the requester. When the metadata provider (e.g., web service provider or web service description service) receive the request, the metadata provider can compare the received hash digest to an independently created hash digest corresponding to the current metadata version in use. If the hash digests match, the requester already is using the correct metadata and another copy of the metadata does not need to be sent. If the hash digests do not match, the metadata provider can send a copy of the current metadata in use to the requester. Similarly, the metadata provider can provide to a requester a hash digest of the current metadata in use, which the requestor can use to determine whether updated metadata is needed.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 2:
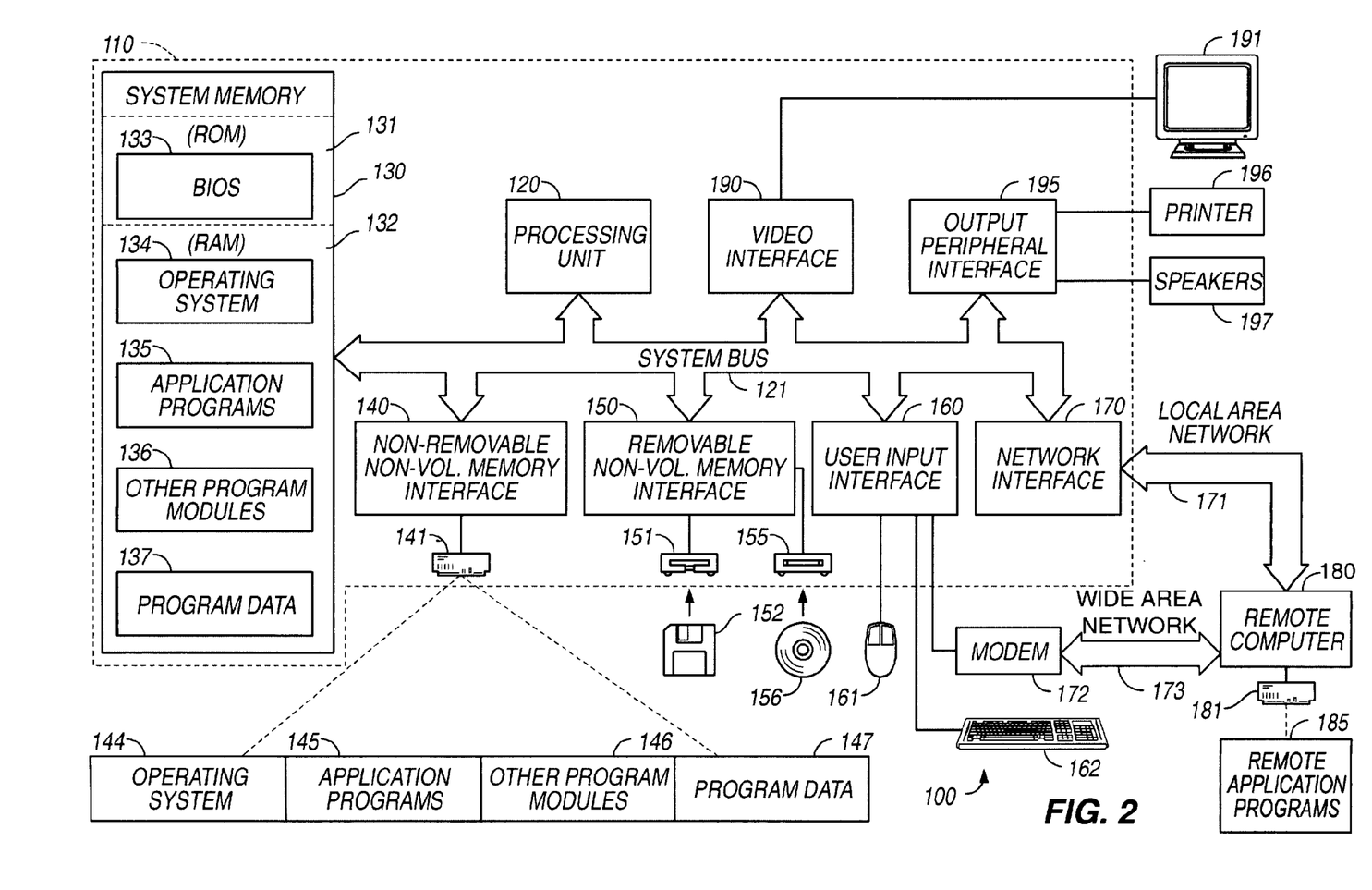
FIG. 2 illustrates a general operating environment that may be used according to one or more illustrative aspects of the invention.

According to one or more aspects of the invention, metadata is described using any protocol neutral communications mechanism, e.g., eXtensible Markup Language (XML), as further described below. FIG. 2 illustrates an example of a suitable computing system environment 100 on which the invention may be implemented in whole or in part. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Figure 3:
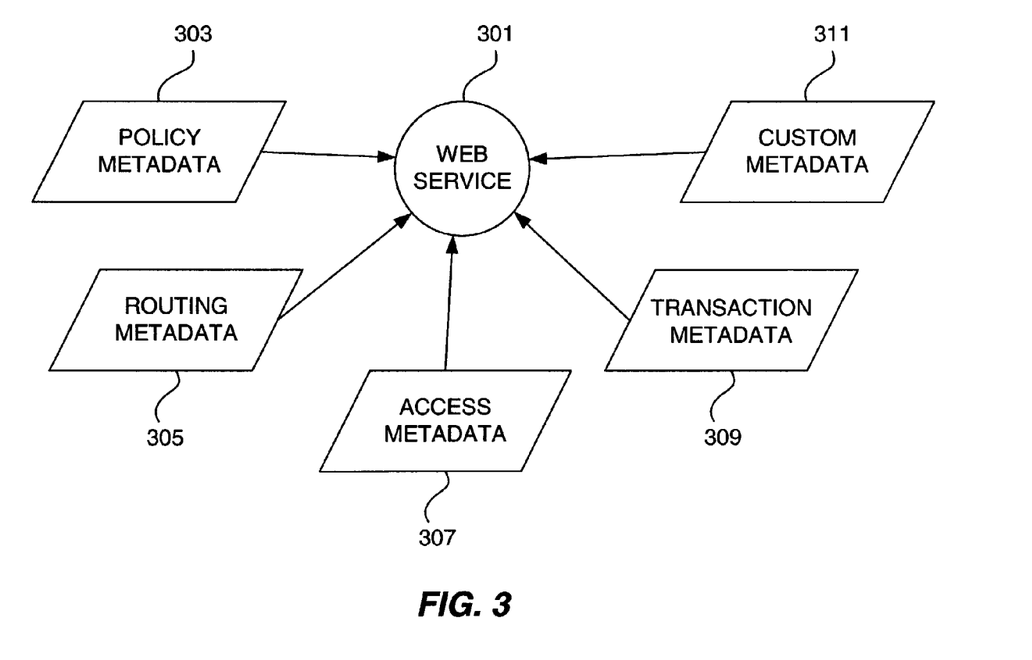
FIG. 3 illustrates a block diagram relating metadata to an object.

FIG. 3 illustrates a block relational diagram of an object and corresponding metadata. Broadly, an object 301 is described by various metadata elements 303, 305, 307, 309, 311. Each metadata element describes some aspect of object 301. Object 301 may be any computer or network object, such as a file, URL, URI, address, directory, web service, router, server, etc. Metadata elements 303, 305, 307, 309, 311 are used to describe features corresponding to object 301. Object 301 may alternatively be a conventional, non-computer object, such as a computer user (i.e., a person).

For example, a web service 301 may be described by various metadata elements 303, 305, 307, 309, 311. Each metadata element may be communicated by the web service object 301 (or by a web service description service) to a requester (not shown) to indicate how the requestor can communicate with the web service to receive information provided by the web service. Alternatively, object metadata might not be used by a requester, but instead may be used by the web service itself upon receipt from an authorized provider (e.g., providing updated policy metadata, access control metadata, etc.).

Suppose web service object 301 is a mailbox web service. Metadata element 303 may describe communication policies of web service 301, such as by indicating that web service 301 requires a Microsoft Passport ID, messages must be encrypted using triple-DES encryption, messages cannot exceed 1 MB in size, etc. Metadata element 305 may describe message routing information specific to the web service, e.g., indicating that messages intended for web service object 301 should be sent to a specified address or through a specified router or routers.

Metadata element 307 may describe access information. That is, metadata may be used to describe who is authorized to access web service 301, such as only those users whose account is paid up to date. Access metadata may also include an access control list (ACL) defining who can access the mailbox web service. Metadata element 309 may describe transaction coordination information for communicating with web service 301, such as by indicating a transaction coordinator for web service 301, and/or other transaction information as described in copending application Ser. No. 10/211,299, filed Aug. 5, 2002, entitled "Coordinating Transactional Web Services."

Metadata element 311 may describe custom features specific to web service object 301, such as mailbox services provided (supported addresses, mail formats, mail protocols, confirmation of delivery, etc.), requirements for various services, and the like.

Figure 4:
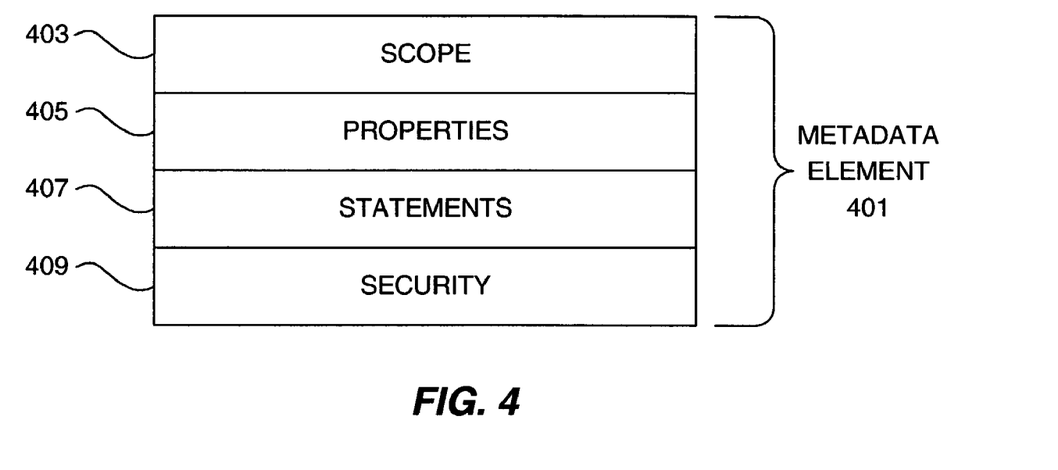
FIG. 4 illustrates a block diagram of metadata according to an illustrative embodiment of the invention.

FIG. 4 illustrates a block diagram of a generic metadata element according to an illustrative aspect of the invention. Metadata element 401 may include a scope 403, one or more properties 405, one or more statements 407, and security information 409.

Scope 403 indicates an arbitrary universe of targets (i.e., the object or objects) to which metadata element 401 corresponds. For example, scope 403 may include a URI (www-.Microsoft.com/. To conform with USPTO practice, the designator 'http://' has been left off the beginning of the above URL), indicating that metadata element 401 describes any web page or web service located under that URI. Scope 403 may include a portion of a directory hierarchy (e.g., c:\root\users\jdoe\), indicating that metadata element 401 describes all files located at or below the specified subdirectory. Scope 403 can also refer to users or user identities, e.g., *@xyz.com,jdoe@xyz.com, "John Doe", etc. Scope 403 may also refer to a user based on biometric information, e.g., by including a digital representation of biometric information specific to the user, such as a fingerprint, thus indicating that the metadata element 401 describes the user with the fingerprint to which the digital biometric information corresponds.

Scope 403 may describe multiple objects using lists, ranges, or any known object description technique, and may describe the universe of targets in an additive (John Doe, but no one else) or subtractive (everyone but John Doe) manner, using declarative (scope="John Doe"), programmatic (scope=run this Java applet), extensional (scope=John, Bill, Mary) and/or intentional, i.e., by description (e.g., scope=The Jones Family, scope=John's mother's dog) descriptors. Scope 403 may describe the scope using arbitrarily complex relationships. Using the generic scope container, metadata element 401 can refer to virtually any object. For example, scope can refer to messages of a specified form, and further based on whether the current location is an intermediary node in a network or a terminal node of a data message. Scope 403 can also depend on whether messages are being sent from a location or to a location, and messages that contain specific information (e.g., the word "banana" in the message body). Scope can refer to messages that have been authenticated, and even to messages that have been authenticated using a specified technology (e.g., X509) or service (e.g., VeriSign), security token of a specific format as well as authority, strength of authentication, biometric data, smart card, or the like. Scope can also refer to the message in which the scope is being communicated (e.g., by message ID). One of skill in the art will appreciate that scope 403 can refer to any universe of targets that can be positively identified based on the data stored in scope 403.

Properties 405 describe properties of metadata element 401. That is, properties 405 may be thought of as metadata describing metadata element 401, such as name, author, expiration date/time, etc., of metadata element 401.

Each statement 407 provides some substantive metadata included in metadata element 401. Statements may be affirmatively recited (e.g., Max_Msg_Len=1024) or included by reference (e.g., Include IDREF="xx"), where the IDREF indicates a file or other object storing one or more metadata statements. Inclusion by reference may be used, for example, when multiple metadata elements need to ensure that identical statements are used. One of skill in the art will appreciate that any external reference may be used to include metadata statements, such as a URI, etc., and also that inclusion by reference may also be used for scope, properties, and security elements.

Security 409 describes security semantics and/or authentication measures to be applied to metadata element 401. For example, security 409 may include a digital signature to ensure that the metadata comes from a source authorized to promulgate the included or referenced metadata statements. One of skill in the art will appreciate that multiple scope, properties, statement, and/or security elements may be included in metadata element 401 as necessary, e.g., to include a scope with two mutually exclusive ranges making up the universe of targets. In addition, scopes, properties, statements, and security information may all be described using arbitrarily complex relationships using any combination of logical operands. For example, multiple overlapping signatures may be used, thus allowing different parts of the metadata to be signed by different parties (e.g., by embedding security metadata within other sections of the container), and also allowing co-signers.

Figure 5:
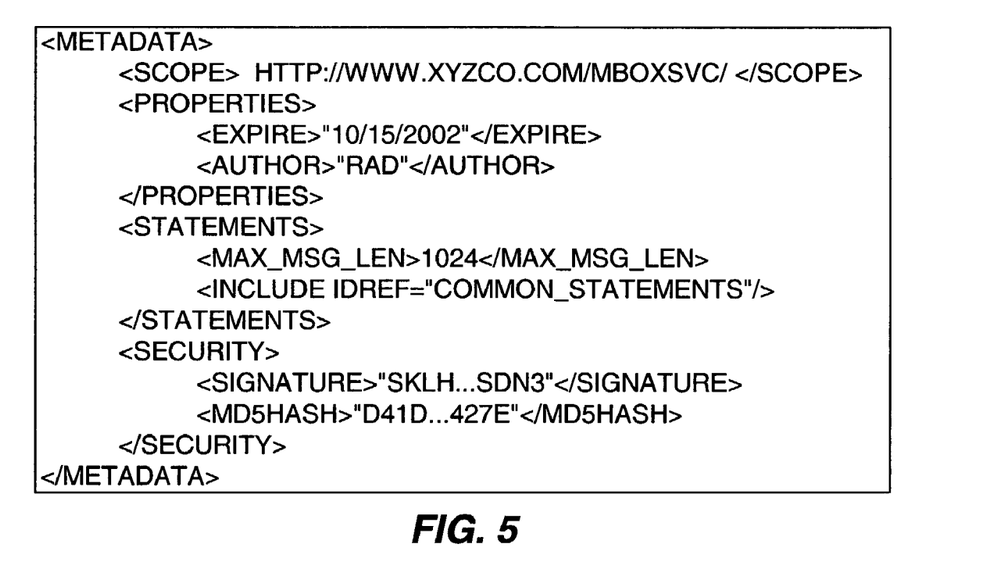
FIG. 5 illustrates metadata described according to an illustrative embodiment of the invention.

The generic metadata element 401 may be described in any protocol-neutral or platform-independent description language, such as XML, Java (or other Java-derived language), and the like. A metadata element described using XML may take a form similar to that illustrated in FIG. 5. One of skill in the art will appreciate that alternative syntax may be used without departing from the spirit and scope of the invention. For example, when the scope refers to a single object, a metadata element may omit the scope reference and instead include an attribute such as <Metadata about=" . . . "> . . . </Metadata>. Metadata statements as described herein may be sent as part of data messages, e.g., simple object access protocol (SOAP) messages, or may be included in web service description documents, such as WSDL documents.

Figure 6:
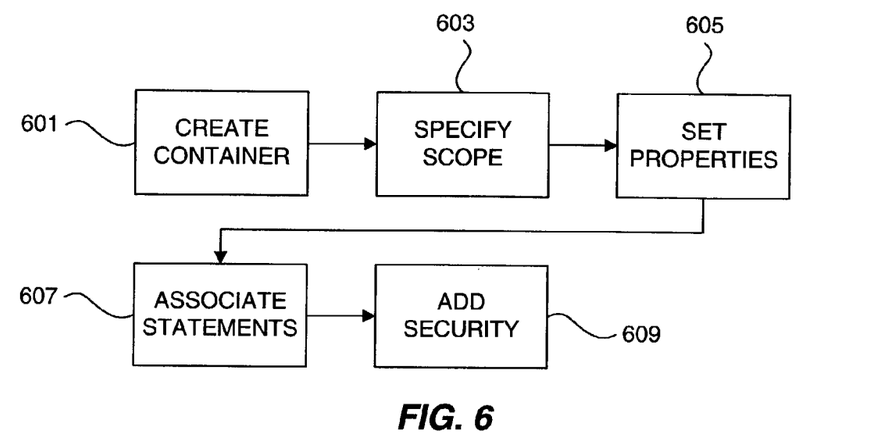
FIG. 6 illustrates a flowchart for creating a metadata container according to an illustrative embodiment of the invention.

FIG. 6 illustrates a flow chart for a method of creating a scoped metadata container according to an illustrative embodiment of the invention. In step 601 an empty container is created. In step 603, the scope is defined and stored in a scope section of the container or, alternatively, as an attribute. In step 605, properties are optionally set and stored in a properties section of the container. In step 607, metadata statements are associated with the container and stored in a statements section of the container. In step 609, security and authentication information is optionally stored in a security section of the container.

Figure 7:
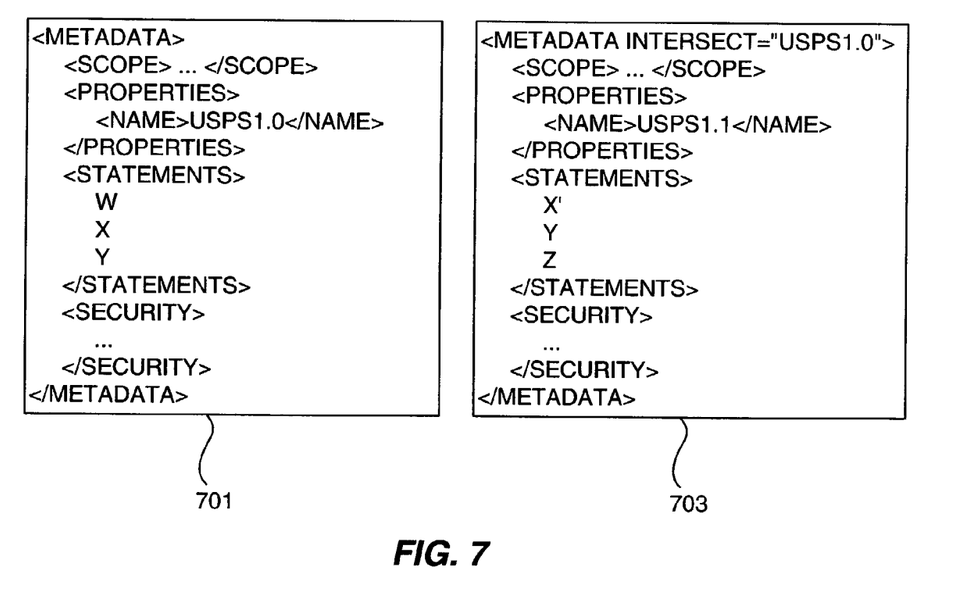
FIG. 7 illustrates a metadata refinement technique according to an illustrative embodiment of the invention.

According to another illustrative aspect of the invention, with reference to FIG. 7, one metadata element 703 may refine, replace, restrict, or intersect with another metadata element 701. For example, within a business organization, each division of the company may use standard division-wide metadata that is required to be included in all metadata elements (e.g., similar to using an "Include IDREF"-type statement) produced by that division. Likewise each department might require standard department-wide metadata included in metadata elements produced by that department, and the company as a whole may require standard company-wide metadata statements included in each metadata element produced by the company. If metadata statements conflict between two levels of the metadata hierarchy (e.g., company versus division), the invention provides a resolution mechanism to determine which statements, if any, remain in effect. For example, a division may include a metadata statement indicating that maximum message length is 1 MB. However, company-wide guidelines may require inclusion of another metadata statement that includes an indication that maximum message length can only be 512 KB. This may be resolved in various ways according to various aspects of the invention.

When two metadata elements refer to the same scope, one metadata element can merge with, replace, or intersect with another metadata element. When the statements of two metadata elements do not conflict, the two metadata elements may be merged together. When the statements do conflict, one metadata element may replace the other, or they may be intersected. During intersection, non-conflicting metadata statements are merged, while conflicting metadata statements are selected according to the most recent or superceding metadata element.

For example, as illustrated in FIG. 7, suppose metadata element 701 contains statements W, X, and Y, and suppose metadata element 703, which intersects with element 701, contains statements X', Y, and Z. An intersection of metadata elements 701 and 703 would contain statements W, X', Y, and Z. Other merge/intersection techniques may also be used as desired. In addition, a metadata element may also indicate that it cannot be replaced, for example, by including <Metadata Final="T"> . . . </Metadata> to indicate that that specific metadata element cannot be replaced or intersected with another metadata element. Those of skill in the art will appreciate that various metadata tags, or attributes, may be used to indicate the nature of the relationship between two metadata elements, e.g., invalidates, replaces, intersects, refines, merges, or the like.

According to another aspect of the invention, logical inferences or an inherent or natural hierarchy may be used to determine whether one metadata element supercedes another. For example, a metadata element with scope=www.foo.com/bar may automatically supercede another metadata element with scope=www.foo.com/. To conform with USPTO practice, the designator 'http:/' has been left off the beginning of the above URLs.

Using metadata refinement and replacement, a web service can define default metadata for general services, and refine the default metadata for based on various service levels. For example, a default metadata element may indicate that Passport authentication must be used, but remain silent as to each user's maximum mailbox size. This default metadata can then be refined to indicate that the maximum mailbox size for users in the default "silver" service level is 1.5 MB. Another metadata element may refine the default metadata element and indicate, for messages authenticated as being from a "gold" service level member, the maximum mailbox size is 10 MB.

As indicated above, policy metadata may be used to convey information directed towards aiding communication with an object, e.g., a web service. Prior to being able to effectively communicate with a web service, a requestor must learn the web service's communication policies. That is, the requestor must obtain the policy metadata associated with the web service in order to learn how to communicate with the web service. According to an illustrative aspect of the invention, a metadata type may optionally be included, e.g., <Metadata Type="policy"> . . . </Metadata> to indicate a class or type of metadata. One of skill in the art will appreciate that alternative syntax, as is known in the art, may be used to indicate a metadata type. For example, metadata statements may include a "type" indicator instead of placing the "type" indicator in the metadata element's header.

For example, in an illustrative embodiment, policy metadata may be represented as a table where each column represents a different policy setting and each row represents a valid policy configuration of columns. Tabular representation is advantageous because, for example, policies can be merged by doing a cross product and intersection to find compatible rows. The table can also be used as another form to communicate a policy. For example, the table can be compressed using sparse table algorithms and binary representations. A sender can then send the table and pass a potentially large table with a small amount of data. When dealing with policies whose assertions are parameterized in a table, the columns can be expanded to be assertion:value if it is possible that some combinations conflict while others do not. In addition, there may be special rules for handling tables where functions are applied. For example, two timeout values might not conflict, but the minimum timeout value is used as the resultant value.

Figure 8:
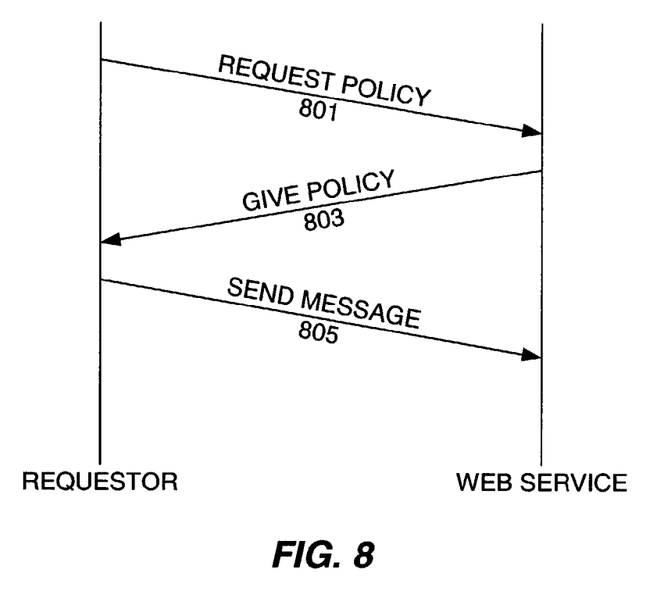
FIG. 8 illustrates a policy metadata request-response message exchange.

FIG. 8 illustrates a typical request-response exchange between a requestor and a web service. In step 801, a requestor sends a request message to a web service, requesting the web service's current policy metadata. The web service, in step 803, sends the current policy metadata back to the requestor. After having obtained the current policy metadata, the requester can send in step 805 a data message to substantively communicate with the web service based on the recently obtained policy metadata. However, this three-step process to initiate substantive communications can be very slow when repeated for a large number of requestors or spanning a large geographic distance. Thus, according to an illustrative aspect of the invention, policy metadata (or other types of metadata) may be piggybacked on data messages in order to provide up to date information that may be used as a basis for subsequent communications. That is, the piggybacked information can be used to dynamically modify behavior for future transmissions.

Figure 9:
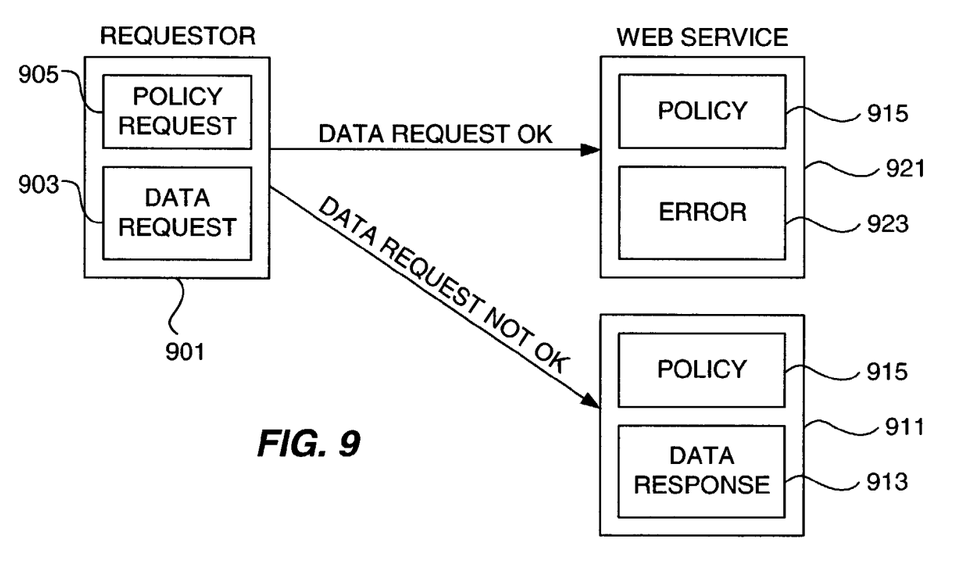
FIG. 9 illustrates message contents during a policy request-response exchange according to an illustrative aspect of the invention.

FIG. 9 illustrates message contents using a piggybacking technique according to an illustrative aspect of the invention.

A requestor initially may or may not know a web service's current policy. Thus, the requestor may format a data request 903 in an initial request 901 according to a default policy stored at the requester, based on expired policy previously obtained from the web service, or based on some other criteria such as user input. The requester also may include a request 905 for the web service's current policy metadata.

After the requestor sends the data request with the piggybacked policy request, one of two scenarios occurs: either the web service can provide a substantive response based on the "best guess"—based data request or it cannot. If the web service can provide a substantive response 911 based on the initial request 901, the substantive response includes a data response portion 913 which includes the requested data, and the current policy information 915, which the requestor can use for subsequent communications. If the web service cannot provide a substantive response based on the initial request 901, the web service sends an error response 921, which includes an error message 923 and the current policy 915. For example, the error message may indicate that the requester is unauthorized, while the policy metadata may indicate that each requester must authenticate using Microsoft® Passport. The requestor can then use the current policy 915 to create a new data request message containing the correct information.

Policy requests and responses may also be piggybacked onto other types of data messages. For example, if the requester is already in communication with the web service provider for another reason (e.g., using a different web service provided by the same provider), the requestor can piggyback a request for the policy information for web service B onto messages with data portions corresponding to web service A.

Figure 10:
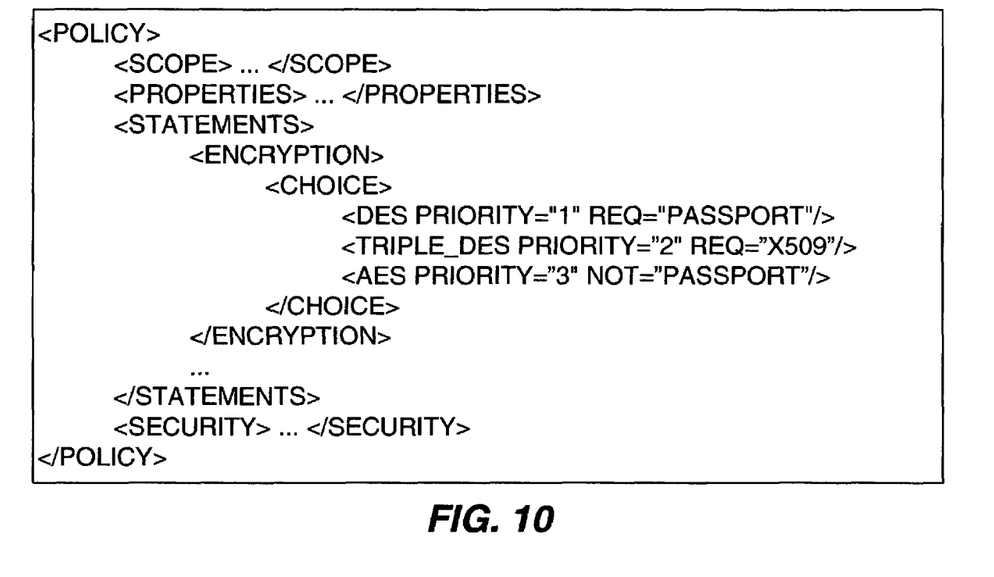
FIG. 10 illustrates policy metadata providing a choice according to an illustrative aspect of the invention.

According to another aspect of the invention, with reference to FIG. 10, policy information (or other metadata types, such as access, routing, etc.) may indicate a choice of acceptable communication options, along with an order of preference for each option. For example, a web service may support three encryption techniques: DES, Triple DES, and AES. The web service may further indicate priorities for each option, e.g., that DES should be used whenever available, Triple DES should be used if DES is not available, and AES should be used only if neither DES nor Triple DES is available. The web service may optionally also specify requirements for each option. For example, if DES is to be used, the user must have authenticated using Microsoft® Passport; if Triple DES is to be used, the user must have authenticated using X.509; and if AES is to be used, the user cannot be using Passport. Thus, if a requester supports DES and Triple DES, but only supports X509 and not Passport, then Triple DES would be selected. Other logical operands or equivalents can be used (e.g., AND, NOT, OR, XOR, OPTIONAL, REQUIRED, etc.) to describe relationships, scopes, choices, and the like.

In order to expedite communication of policy metadata and confirmation of policy versions in use, a hash digest may be used to confirm that each party (requestor and metadata provider) is referring to the same version of policy metadata (e.g., as defined as a property of the policy element metadata). For example, policy metadata for some web services may be megabytes in size or even larger. To send the complete policy in response to every request would consume valuable processor time and limited communication bandwidth. Instead of sending the complete policy, the web service may send a hash digest of the current policy in use. The requester, upon receiving the hash digest, can compute an independent hash digest based on a previously stored or cached version of the web service's policy. If the two hash digests match, the requestor knows that it is using the correct policy version, and can immediately begin communicating with the web service. If the two hash digests do not match, the requestor sends a follow up policy request to the web service indicating that a complete copy of policy metadata is needed. One of skill in the art will appreciate that any hash algorithm may be used, however, a cryptographically strong hash such as MD5 or SHA-1 is preferred. Hash digests may also be used with metadata included by reference to ensure that what is being included is what should be included, and is not false metadata provided by a malicious or unauthorized entity.

Alternatively, when a requestor sends a request for policy metadata, the requestor may include a hash digest of the current policy metadata for the web service that the requestor has stored in memory. The metadata provider (e.g., a web service provider or web service description service) can then determine whether or not to send new policy metadata based on whether the hash digest of the current policy metadata differs from the hash digest received with the policy metadata request.

Optionally, the requestor may include in the policy request, in addition to the policy hash digest, a policy version to which the hash digest corresponds. The metadata provider not only can determine whether the requester is using an old version of policy metadata, but also can confirm whether the old version of policy metadata is unaltered. The metadata provider confirms the old version is unaltered by independently creating a hash digest of the old version of the metadata policy using a copy of the old version stored in memory. Once the metadata provider has confirmed that the old version is unaltered, the metadata provider can determine the differences between the old version that the requestor already has and the current version in use. The metadata provider can then create a "delta" policy metadata element that relates to the old version in use by the requestor such that the old version, once refined, replaced, intersected, etc., is logically the same as the current policy metadata version.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A memory and a data processing system, said memory for storing data for access by a program having one or more objects executing on data processing system, said memory storing data comprising:
   at least one XML metadata element defined by a pair of beginning and ending XML metadata tags, said XML metadata element comprising:
   a first data field bounded by a pair if first XML beginning and ending tags, the first data field containing at least one metadata statement data specifying a limitation of an object; and
   a second data field bounded by a pair of second XML beginning and ending tags, the second data field containing a metadata scope statement data that expresses a range of objects to which the at least one metadata statement data refers,
   said data processing system applies the at least one limitation to objects within the range of objects.

2. The memory of claim 1, said XML metadata element further comprising:
   a third data field bounded by a pair of third XML beginning and ending tags, the third data field containing at least one metadata property data specifying a property of the XML metadata element.

3. The memory of claim 1, said XML metadata element further comprising:
   a third data field bounded by a pair of third XML beginning and ending tags, the third data field containing security data specifying security to be applied to the at least one metadata statement data.

4. One or more computer readable storage media storing computer executable instructions comprising:
   receiving via a network connection a data message having a first data field containing at least one metadata statement data, wherein the first data field comprises a first markup language tag indicating a type of the at least one metadata statement data, and having a second data field bound by a pair of second markup language tags, the second data field containing a metadata scope data that defines a range of objects limited by the at least one metadata statement data; and
   operating a web service object in accordance with the received message by applying the at least one metadata statement data to the web service object included within the range of objects.

5. The computer readable media of claim 4, wherein the data message
   stores at least one metadata property data describing a property of the data message.

6. The computer readable media of claim 5, wherein the at least one
   metadata property contains security data expressing security to be applied to said message.

7. The computer readable media of claim 4, wherein the metadata scope data identifies a user.

8. The computer readable media of claim 7, wherein the metadata scope data comprises biometric information corresponding to the user.

9. The computer readable media of claim 4, wherein the metadata scope data identifies messages having predetermined content.

10. The computer readable media of claim 4, wherein the metadata scope data comprises a uniform resource identifier (URI).

11. The computer readable media of claim 4, wherein the metadata scope data comprises a message destination.

12. The computer readable media of claim 4, wherein the metadata scope data identifies a message originator.

13. The computer readable media of claim 4, wherein the metadata scope data encompasses intermediary network nodes between a message originator and a message destination.

14. The computer readable media of claim 4, wherein the metadata scope data encompasses a message ID.

15. The computer readable media of claim 4, wherein the metadata scope data identifies an authentication status of subsequently received messages.

16. The computer readable media of claim 4, wherein the data message
   comprises a web services description language (WSDL) document.

17. The computer readable media of claim 4, wherein one of the at least one metadata statement data identifies a plurality of options corresponding to the metadata scope.

18. The computer readable media of claim 17, wherein each option is associated with a different service level.

19. The computer readable media of claim 17, wherein each option is associated with a different conditional requirement.

20. The computer readable media of claim 4, further comprising
   receiving a second data message having a third data field containing at least one metadata statement data,
   said instructions further comprising:
   associating the at least one metadata statement data with previously communicated
   third field containing the at least one metadata statement data, based on information stored in the data message.

21. The computer readable media of claim 20, wherein associating further comprises superseding the previously communicated at least one metadata statement data contained in the third data field with the at least one metadata statement data contained in the first field.

22. The computer readable media of claim 20, wherein associated further
   comprises intersecting the at least one metadata statement data contained in the first data field with the previously communicated metadata statement data contained in the third data field, wherein during intersection nonconflicting metadata statement data are merged and conflicting metadata statement data are selected according to a superseding metadata element.

23. The computer readable media of claim 4, wherein the metadata scope data identifies a message exchange pattern.

24. The computer readable media of claim 4, wherein the at least one metadata statement data comprises a table of policy metadata indicating valid policy configurations.

25. The computer readable media of claim 4, where the metadata scope data encompasses a predetermined security token.

* * * * *

UNITED STATES PATENT AND TRADEMARK OFFICE
CERTIFICATE OF CORRECTION

PATENT NO.       : 7,451,157 B2
APPLICATION NO.  : 10/270440
DATED            : November 11, 2008
INVENTOR(S)      : Christopher G. Kaler et al.

It is certified that error appears in the above-identified patent and that said Letters Patent is hereby corrected as shown below:

In Title page, in field (75), under "Inventors" column 1, line 2, delete "Shewchuck," and insert -- Shewchuk, --, therefor.

In column 11, line 49, in Claim 1, after "executing on" insert -- said --.

In column 13, line 11, in Claim 20, before "previously" insert -- the --.

Signed and Sealed this
Third Day of May, 2011

David J. Kappos
*Director of the United States Patent and Trademark Office*